US009309884B2

(12) United States Patent
Akbari (10) Patent No.: US 9,309,884 B2
(45) Date of Patent: Apr. 12, 2016

(54) DOWNHOLE MOTOR OR PUMP COMPONENTS, METHOD OF FABRICATION THE SAME, AND DOWNHOLE MOTORS INCORPORATING THE SAME

(75) Inventor: Hossein Akbari, Bristo (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 521 days.

(21) Appl. No.: 12/955,545

(22) Filed: Nov. 29, 2010

(65) Prior Publication Data

US 2012/0134861 A1 May 31, 2012

(51) Int. Cl.
F04C 2/07 (2006.01)
B29C 45/14 (2006.01)
F04C 13/00 (2006.01)
F04C 2/107 (2006.01)
B29L 31/00 (2006.01)

(52) U.S. Cl.
CPC ........... *F04C 2/1071* (2013.01); *B29C 45/1459* (2013.01); *F04C 13/008* (2013.01); *B29K 2995/0046* (2013.01); *B29L 2031/749* (2013.01); *B29L 2031/7496* (2013.01); *F04C 2230/20* (2013.01); *F04C 2230/91* (2013.01); *F04C 2240/20* (2013.01)

(58) Field of Classification Search
CPC .................. B29C 45/1459; B29K 2995/0046; B29L 2031/749; B29L 2031/7496; F04C 13/008; F04C 2230/20; F04C 2230/91; F04C 2240/20; F04C 2/1071
USPC ......................... 416/241; 74/458; 418/156, 48
See application file for complete search history.

(56) References Cited

U.S. PATENT DOCUMENTS

| 1,892,217 | A | * | 12/1932 | Moineau | 74/458 |
|---|---|---|---|---|---|
| 2,464,011 | A | | 3/1949 | Wade | |
| 4,100,962 | A | | 7/1978 | Housman | |
| 4,211,521 | A | * | 7/1980 | Streicher | 418/48 |
| 4,646,856 | A | | 3/1987 | Dismukes | |
| 4,909,337 | A | | 3/1990 | Kochnev et al. | |
| 5,113,953 | A | | 5/1992 | Noble | |
| 5,135,059 | A | | 8/1992 | Turner et al. | |

(Continued)

FOREIGN PATENT DOCUMENTS

| CN | 1054470 A | 9/1991 |
|---|---|---|
| CN | 2760211 Y | 2/2006 |

(Continued)

OTHER PUBLICATIONS

"Polymer Technology Dictionary" by Tony Whelen, Chapman & Hall, New York, 1994, upper left portion of p. 397.*

(Continued)

*Primary Examiner* — Jorge Pereiro
*Assistant Examiner* — Paul Thiede
(74) *Attorney, Agent, or Firm* — Kimberly Ballew (57) ABSTRACT

Exemplary embodiments provide a progressive cavity pump or motor including a stator having a longitudinal bore and a rotor rotatably disposed within the longitudinal bore of the stator. The rotor includes a rotor core and a resilient outer layer formed of a resilient material bonded onto the outer surface of the rotor core. The resilient outer layer sealably connects the helical configurations on the outer surfaces of the rotor and the stator as the rotor rotates within the longitudinal bore of the stator.

12 Claims, 9 Drawing Sheets

(56) References Cited

U.S. PATENT DOCUMENTS

| | | | |
|---|---|---|---|
| 5,221,197 A | 6/1993 | Kochnev et al. | |
| 5,265,682 A | 11/1993 | Russell et al. | |
| 5,520,255 A | 5/1996 | Barr et al. | |
| 5,553,678 A | 9/1996 | Barr et al. | |
| 5,553,679 A | 9/1996 | Thorp | |
| 5,582,259 A | 12/1996 | Barr | |
| 5,603,385 A | 2/1997 | Colebrook | |
| 5,673,763 A | 10/1997 | Thorp | |
| 5,685,379 A | 11/1997 | Barr et al. | |
| 5,695,015 A | 12/1997 | Barr et al. | |
| 5,706,905 A | 1/1998 | Barr | |
| 5,759,019 A * | 6/1998 | Wood et al. | 418/48 |
| 5,778,992 A | 7/1998 | Fuller | |
| 5,803,185 A | 9/1998 | Barr et al. | |
| 5,911,284 A | 6/1999 | Von Gynz-Rekowski et al. | |
| 5,971,085 A | 10/1999 | Colebrook | |
| 6,089,332 A | 7/2000 | Barr et al. | |
| 6,092,610 A | 7/2000 | Kosmala et al. | |
| 6,158,529 A | 12/2000 | Dorel | |
| 6,173,794 B1 | 1/2001 | Von Gynz-Rekowski et al. | |
| 6,244,361 B1 | 6/2001 | Comeau et al. | |
| 6,364,034 B1 | 4/2002 | Schoeffler | |
| 6,394,193 B1 | 5/2002 | Askew | |
| 6,527,512 B2 | 3/2003 | Bertin et al. | |
| 6,543,132 B1 | 4/2003 | Krueger et al. | |
| 6,543,554 B2 | 4/2003 | Smith | |
| 6,604,922 B1 * | 8/2003 | Hache | 418/48 |
| 6,827,160 B2 | 12/2004 | Blair et al. | |
| 7,093,401 B2 | 8/2006 | Collins | |
| 7,192,260 B2 | 3/2007 | Lievestro et al. | |
| 7,396,220 B2 | 7/2008 | Delpassand et al. | |
| 7,442,019 B2 | 10/2008 | Kaiser et al. | |
| 7,739,792 B2 * | 6/2010 | Lee | F04C 2/1075 29/888.023 |
| 2001/0052428 A1 | 12/2001 | Larronde et al. | |
| 2002/0011359 A1 | 1/2002 | Webb et al. | |
| 2002/0122722 A1 | 9/2002 | Bertin et al. | |
| 2008/0190669 A1 | 8/2008 | Cioceanu | |
| 2009/0016893 A1 * | 1/2009 | Lee et al. | 416/241 R |
| 2009/0095528 A1 | 4/2009 | Hay et al. | |
| 2009/0169404 A1 * | 7/2009 | Sindt | F04C 2/1073 418/48 |

FOREIGN PATENT DOCUMENTS

| | | |
|---|---|---|
| JP | 04294116 | 10/1992 |
| WO | 2009/087475 | 7/2009 |

OTHER PUBLICATIONS

Lyons et al., "Air & Gas Drilling Manual: Applications for Oil & Gas Recovery Wells & Geothermal Fluids Recovery Wells," Ch. 11.2, 3rd ed. (2009).

G. R. Samuel, Downhole Drilling Tools: Theory & Practice for Engineers & Students, pp. 288-333 (2007).

W. C. Lyons and G. J. Plisga, eds., "Standard Handbook of Petroleum & Natural Gas Engineering," 4-276 to 4-299 (2006).

Y. A. Gelfat et al., "Advanced Drilling Solutions: Lessons from the FSU," 154-172 (2003).

First Office Action for Chinese Application No. 201110396766.2 dated Feb. 17, 2015.

* cited by examiner

DOWNHOLE MOTOR OR PUMP COMPONENTS, METHOD OF FABRICATION THE SAME, AND DOWNHOLE MOTORS INCORPORATING THE SAME

BACKGROUND

Downhole motors (colloquially known as "mud motors") are powerful generators used in drilling operations to turn a drill bit. Downhole motors are often powered by a drilling fluid, such as mud, which is also used to lubricate the drill string and to transport cuttings and particulate matter away from the borehole.

A downhole motor may act as a positive displacement motor (PDM) in which a drilling fluid pumped through the interior converts hydraulic energy into mechanical energy to turn a drilling bit, which has applications in well drilling. A positive displacement motor propels the drilling fluid by means of the progress of a set of cavities in the interior of the motor. A positive displacement motor typically includes a helical rotor disposed within a stator, where the rotor seals tightly against the stator as it rotates to form a set of cavities in between. As the rotor rotates within the stator, the cavities move and the drilling fluid in the cavities is pumped through the assembly.

SUMMARY

Exemplary embodiments provide downhole motor or pump components, downhole motors incorporating exemplary downhole motor or pump components, and methods of fabricating exemplary downhole motor or pump components.

According to one exemplary embodiment, a method of fabricating a progressive cavity motor rotor is provided. The method includes providing a mold defining a cavity having a cavity surface shape with a configuration complementary to an outer surface shape of a metallic rotor body, the cavity of the mold having a diameter larger than an outermost diameter of the rotor body. The method includes positioning a first section of the rotor body within the cavity of the mold, providing a resilient material in a space formed between the cavity surface of the mold and the outer surface of the first section of the rotor body, and constraining expansion of the mold during bonding of the resilient material to the first section of the rotor body.

The method may include increasing a temperature and a pressure in the cavity of the mold such that the resilient material takes the shape of the outer surface of the first section of the rotor body. The method may include applying an adhesive material to the outer surface of the first section of the rotor body for enhanced bonding of the resilient material to the outer surface of the first section of the rotor body and/or enhancing bonding of the resilient material to the first section of the rotor body using plasma bonding.

The method may include centering the rotor body within the cavity of the mold using an end cap affixed to at least one end of the mold. The method may include clamping the mold around the first section of the rotor body using a hydraulic press. The method may include clamping the mold around the first section of the rotor body using a low thermal expansion clamping mechanism to secure the mold in place. The temperature within the cavity of the mold may be raised using a heat source to cause expansion of the rotor body and the resilient material while maintaining the constraint on the expansion of the mold, the expansion of the rotor body and the resilient material against the clamping mechanism causing an increase in the pressure in the mold. The layer of the resilient material may be cured onto the first section of the rotor body using the combination of the increased temperature and the increased pressure within the mold. The heat source may emit any wavelength of infrared radiation and/or ultraviolet radiation.

The resilient material may be provided by injecting the resilient material into the space between the cavity surface of the mold and the outer surface of the first section of the rotor body. The resilient material may be provided by covering the first section of the rotor body with a layer of the resilient material. The layer of the resilient material may be in the form of a tube or a sheet.

The method may include applying a vacuum through the rotor body to the resilient material before, during or after bonding of the resilient material to the first section of the rotor body.

In an exemplary embodiment, the first section of the rotor body constitutes the entire length of the rotor body. In another exemplary embodiment, the length of the first section of the rotor is shorter than the entire length of the rotor body. The length of the mold may be shorter than the entire length of the rotor body.

The method may also include positioning a second section of the rotor body within the cavity of the mold, providing the resilient material in the space formed between the cavity surface of the mold and the outer surface of the first section of the rotor body, and constraining expansion of the mold during bonding of the resilient material to the second section of the rotor body. Prior to positioning the second section of the rotor body within the cavity of the mold, the mold may be repositioned along the length of the rotor body from the first section to the second section. Prior to positioning the second section of the rotor body within the cavity of the mold, the mold may be repositioned within the cavity of the mold such that the second section of the rotor body is aligned with the surface of the cavity surface shape of the cavity.

In an exemplary embodiment, the mold may overlap the first and second sections of the rotor body. In another exemplary embodiment, the mold does not overlap the first and second sections of the rotor body.

In accordance with another exemplary embodiment, a progressive cavity drive component is provided. The progressive cavity drive component includes a first progressive cavity drive component rotatably positionable within a longitudinal bore of a second progressive cavity drive component. The first progressive cavity drive component includes a metallic shaft having a first helical configuration formed on an outer surface of the metallic shaft that is complementary to a helical surface configuration of the second progressive cavity drive component, and a resilient outer layer formed of a resilient material bonded to the metallic shaft, the resilient material remaining resilient across a temperature range of at least between its glass transition temperature and about 250° C. The glass transition temperature of the resilient material may range between about 30° C. and about 150° C. In an exemplary embodiment, the resilient material may remain resilient below its glass transition temperature.

The resilient outer layer may be configured to sealably connect the first helical configuration of the first progressive cavity drive component to the second helical configuration of the second progressive cavity drive component as the first progressive cavity drive component rotates within the longitudinal bore of the second progressive cavity drive component.

The first progressive cavity drive component may include an adhesive layer disposed between the metallic shaft and the resilient outer layer to enhance bonding of the resilient outer layer to the metallic shaft. The bonding of the resilient outer layer to the metallic shaft may be enhanced using plasma bonding.

In an exemplary embodiment, the resilient outer layer is disposed uniformly in proximity to the outer surface of the metallic shaft. In another exemplary embodiment, the resilient outer layer is disposed non-uniformly in proximity to the outer surface of the metallic shaft.

In an exemplary embodiment, the metallic shaft of the first progressive cavity drive component includes a hollow metallic core. In another exemplary embodiment, the metallic shaft of the first progressive cavity drive component includes a solid metallic core.

The second progressive cavity drive component may include a tubular structure having the longitudinal bore with an inner bore surface having the first helical configuration. In an exemplary embodiment, the tubular structure is metallic.

In an exemplary embodiment, the first progressive cavity drive component is a rotor and the second progressive cavity drive component is a stator.

In accordance with another exemplary embodiment, a progressive cavity motor rotor mold is provided for use in bonding a resilient material to a progressive cavity motor rotor. The mold includes a cavity having an inner helical surface complementary to an outer helical surface of the progressive cavity motor rotor, and a low thermal expansion constraining mechanism for constraining expansion of the mold during bonding of the resilient material to the rotor body.

The mold may include a positioning mechanism for axial positioning a longitudinal axis of the progressive cavity motor rotor along the longitudinal axis of the mold.

The mold may include an aperture for introducing a resilient material into the cavity of the mold.

The mold may include a heat source for raising a temperature within the cavity of the mold to cause bonding of the resilient material to the progressive cavity motor rotor.

In accordance with another exemplary embodiment, a system for drilling or a downhole tool is provided. The system or tool includes a first progressive cavity drive component having a longitudinal bore and at least one radially inwardly projecting lobe extending along a selected length on an inner surface of the first progressive cavity drive component, and a second progressive cavity drive component rotatably positionable within the longitudinal bore of the first progressive cavity drive component. The second progressive cavity drive component includes a metallic shaft having at least one radially outwardly projecting lobe extending along a selected length on an outer surface of the metallic shaft that is complementary to the at least one radially inwardly projecting lobe of the first progressive cavity drive component, and a resilient outer layer of the metallic shaft formed of a resilient material, the resilient material remaining resilient across a temperature range of between its glass transition temperature and about 250° C. The glass transition temperature of the resilient material ranges between about 30° C. and about 150° C. In an exemplary embodiment, the resilient material remains resilient below its glass transition temperature.

One of ordinary skill in the art will appreciate that the present invention is not limited to the specific exemplary embodiments described above. Many alterations and modifications may be made by those having ordinary skill in the art without departing from the spirit and scope of the invention.

BRIEF DESCRIPTION OF THE DRAWINGS

The foregoing and other objects, aspects, features and advantages of exemplary embodiments will become more apparent and may be better understood by referring to the following description taken in conjunction with the accompanying drawings, in which.

DETAILED DESCRIPTION

Exemplary embodiments provide systems, devices and methods for providing a motor or pump rotor having an outer layer formed of a resilient material in order to reliably seal the outer surface of the rotor against the inner surface of a stator. An exemplary method of fabricating a rotor includes providing a mold defining a cavity having a cavity surface shape with a configuration complementary to an outer surface shape of a metallic rotor body, the cavity of the mold having a diameter larger than an outermost diameter of the rotor body. The exemplary method includes positioning a first section of the rotor body within the cavity of the mold, providing a resilient material in a space formed between the cavity surface of the mold and the outer surface of the first section of the rotor body, and constraining expansion of the mold during bonding of the resilient material to the first section of the rotor body.

As used herein, "bonding" means direct bonding between two materials and/or surfaces, or indirect bonding between two materials and/or surfaces using one or more bonding agents that facilitate the process of bonding.

As used herein, "curing" means direct curing between two materials and/or surfaces, or indirect curing between two materials and/or surfaces using one or more bonding agents that facilitate the process of curing.

Figure 1:
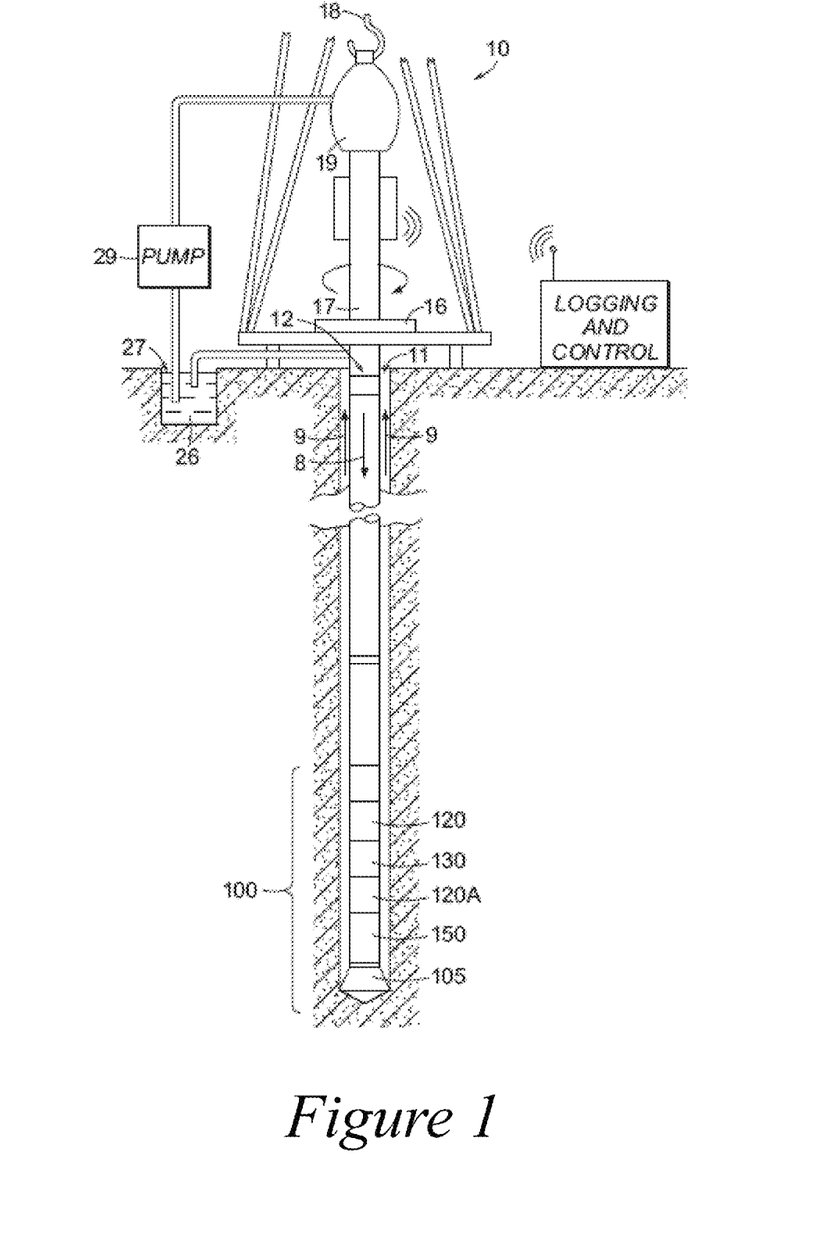
FIG. 1 illustrates a wellsite system in which exemplary embodiments may be employed.

FIG. 1 illustrates an exemplary wellsite system in which exemplary embodiments may be employed. The wellsite may be onshore or offshore. In an exemplary wellsite system, a borehole 11 is formed in subsurface formations by drilling. The method of drilling to form the borehole 11 may include, but is not limited to, rotary and directional drilling. A drill string 12 is suspended within the borehole 11 and has a bottom hole assembly (BHA) 100 that includes a drill bit 105 at its lower end.

An exemplary surface system includes a platform and derrick assembly 10 positioned over the borehole 11. An exemplary assembly 10 includes a rotary table 16, a kelly 17, a hook 18 and a rotary swivel 19. The drill string 12 is rotated by the rotary table 16, energized by means (not shown) which engages the kelly 17 at the upper end of the drill string 12. The drill string 12 is suspended from the hook 18, attached to a traveling block (not shown) through the kelly 17 and the rotary swivel 19 which permits rotation of the drill string 12 relative to the hook 18. A top drive system could alternatively be used in other exemplary embodiments.

An exemplary surface system also includes a drilling fluid 26, e.g., mud, stored in a pit 27 formed at the wellsite. A pump 29 delivers the drilling fluid 26 to the interior of the drill string 12 via one or more ports in the swivel 19, causing the drilling fluid to flow downwardly through the drill string 12 as indicated by directional arrow 8. The drilling fluid exits the drill string 12 via one or more ports in the drill bit 105, and then circulates upwardly through the annulus region between the outside of the drill string 12 and the wall of the borehole, as indicated by directional arrows 9. In this manner, the drilling fluid lubricates the drill bit 105 and carries formation cuttings and particulate matter up to the surface as it is returned to the pit 27 for recirculation.

The exemplary bottom hole assembly 100 includes one or more logging-while-drilling (LWD) modules 120/120A, one or more measuring-while-drilling (MWD) modules 130, one or more roto-steerable systems and motors (not shown), and the drill bit 105. It will also be understood that more than one LWD module and/or more than one MWD module may be employed in exemplary embodiments, e.g. as represented at 120 and 120A.

The LWD module 120/120A is housed in a special type of drill collar, and includes capabilities for measuring, processing, and storing information, as well as for communicating with the surface equipment. The LWD module 120/120A may also include a pressure measuring device and one or more logging tools.

The MWD module 130 is also housed in a special type of drill collar, and includes one or more devices for measuring characteristics of the drill string 12 and drill bit 105. The MWD module 130 also includes one or more devices for generating electrical power for the downhole system. In an exemplary embodiment, the power generating devices include a mud turbine generator (also known as a "mud motor") powered by the flow of the drilling fluid. In other exemplary embodiments, other power and/or battery systems may be employed to generate power.

The MWD module 130 also includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the exemplary wellsite system of FIG. 1 is in conjunction with controlled steering or "directional drilling." Directional drilling is the intentional deviation of the wellbore from the path it would naturally take. In other words, directional drilling is the steering of the drill string 12 so that it travels in a desired direction. Directional drilling is, for example, advantageous in offshore drilling because it enables multiple wells to be drilled from a single platform. Directional drilling also enables horizontal drilling through a reservoir. Horizontal drilling enables a longer length of the wellbore to traverse the reservoir, which increases the production rate from the well.

A directional drilling system may also be used in vertical drilling operation. Often the drill bit will veer off of a planned drilling trajectory because of the unpredictable nature of the formations being penetrated or the varying forces that the drill bit experiences. When such a deviation occurs, a directional drilling system may be used to put the drill bit back on course.

A known method of directional drilling includes the use of a rotary steerable system ("RSS"). In an exemplary embodiment that employs the wellsite system of FIG. 1 for directional drilling, a roto-steerable subsystem 150 is provided. In an exemplary RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems.

In an exemplary "point-the-bit" rotary steerable system, the axis of rotation of the drill bit is deviated from the local axis of the bottom hole assembly in the general direction of the new hole. The hole is propagated in accordance with the customary three-point geometry defined by upper and lower stabilizer touch points and the drill bit. The angle of deviation of the drill bit axis coupled with a finite distance between the drill bit and lower stabilizer results in the non-collinear condition required for a curve to be generated. This may be achieved in a number of different ways, including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of "point-the-bit" type rotary steerable systems and their operation are described in U.S. Pat. Nos. 6,394,193; 6,364,034; 6,244,361; 6,158,529; 6,092,610; and 5,113,953; and U.S. Patent Application Publication Nos. 2002/0011359 and 2001/0052428, which are expressly incorporated herein in their entireties by reference.

In an exemplary "push-the-bit" rotary steerable system, there is no specially identified mechanism that deviates the bit axis from the local bottom hole assembly axis. Instead, the requisite non-collinear condition is achieved by causing either or both of the upper or lower stabilizers to apply an eccentric force or displacement in a direction that is preferentially orientated with respect to the direction of hole propagation. This may be achieved in a number of different ways, including non-rotating (with respect to the hole) eccentric stabilizers (displacement based approaches) and eccentric actuators that apply force to the drill bit in the desired steering direction. Steering is achieved by creating non co-linearity between the drill bit and at least two other touch points. In its idealized form, the drill bit is required to cut side ways in order to generate a curved hole. Examples of "push-the-bit" type rotary steerable systems and their operation are described in U.S. Pat. Nos. 6,089,332; 5,971,085; 5,803,185; 5,778,992; 5,706,905; 5,695,015; 5,685,379; 5,673,763; 5,603,385; 5,582,259; 5,553,679; 5,553,678; 5,520,255; and 5,265,682, which are expressly incorporated herein in their entireties by reference.

Figures 2A, 2B, 2C:
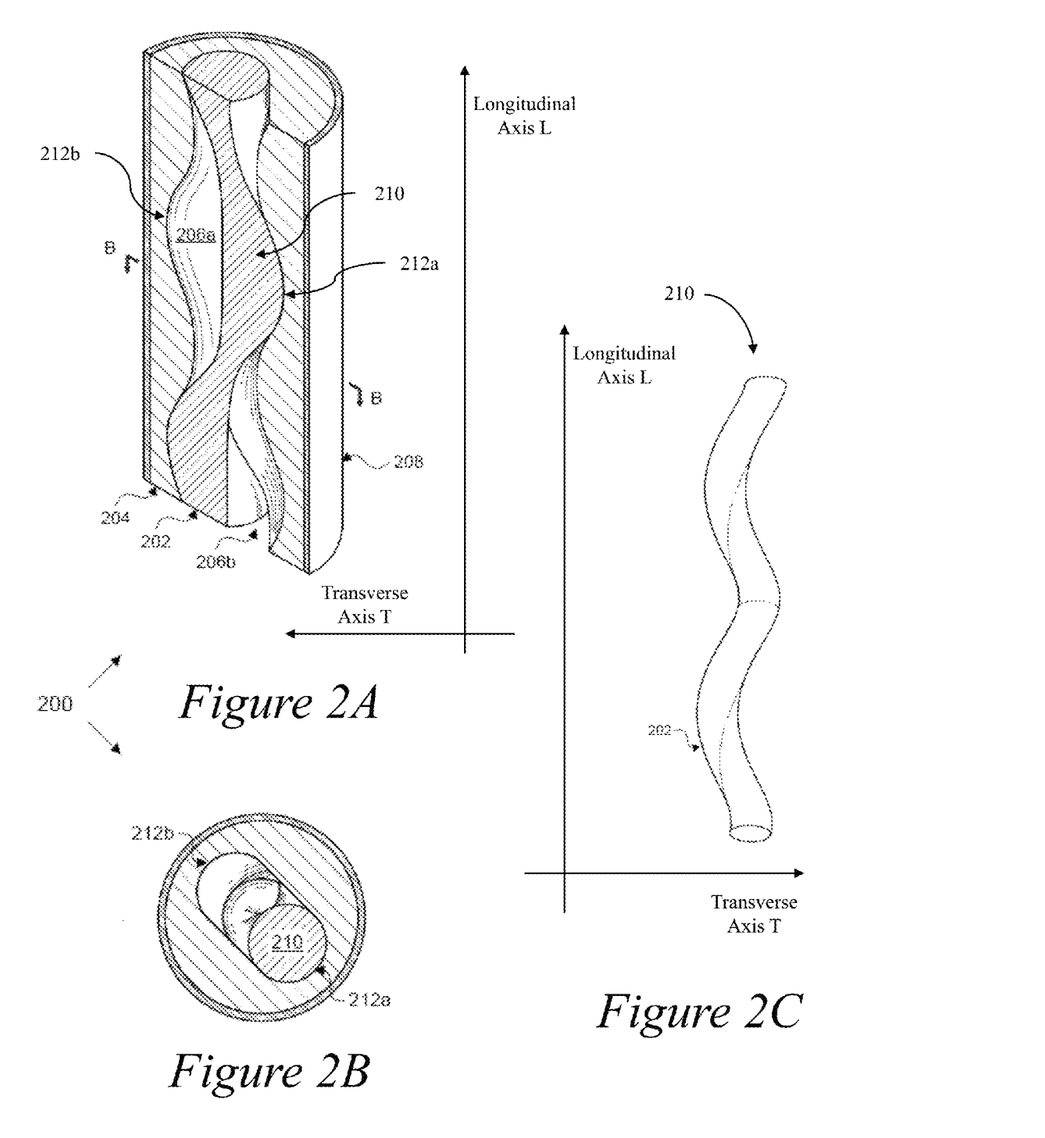
FIG. 2A illustrates a cross-sectional view taken along a longitudinal axis of a Moineau-type positive displacement downhole motor having a 1:2 lobe profile according to an exemplary embodiment.
FIG. 2B illustrates a cross-sectional view taken along section B-B of the Moineau-type positive displacement downhole motor of FIG. 2A according to an exemplary embodiment.
FIG. 2C illustrates a perspective view of a rotor having a 1:2 lobe profile according to an exemplary embodiment.

FIGS. 2A-2C illustrate an exemplary Moineau-type positive displacement downhole motor 200. More specifically, FIG. 2A illustrates a cross-sectional view taken along a longitudinal axis L of an exemplary Moineau-type positive displacement downhole motor 200 having a 1:2 lobe profile. FIG. 2B illustrates a cross-sectional view taken along section B-B of the exemplary Moineau-type positive displacement downhole motor illustrated in FIG. 2A. FIG. 2C illustrates a perspective view of the exemplary rotor illustrated in FIG. 2A.

The exemplary downhole motor 200 includes a helical rotor 202 rotatably disposed within the longitudinal bore of a helical stator 204. The rotor 202 may be a helical member fabricated from a rigid material including, but not limited to, one or more metals (e.g., steel, stainless steel, titanium, etc), one or more resins, one or more composite materials, etc. The rotor 202 may be fully solid in an exemplary embodiment and may be hollow in another exemplary embodiment. The outer surface of the rotor 202 may have a male helical formation having any suitable number of threads, typically with $n_r$ starts.

The stator 204 may be an oblong, helical member and may be fabricated from a material including, but not limited to, one or more elastomers, powder metal, metal, one or more composite materials, etc. The stator may be fully solid except for the inner bore in an exemplary embodiment. The inner surface of the stator 204 may have a female helical formation having any suitable number of threads, typically with $n_s+1$ starts. The female helical formation on the stator 204 cooperates with the male helical formation on the rotor 202. In some exemplary embodiments, the stator 204 is received within a stator tube 208. The stator tube 208 may partially limit the deformation of the stator 204 as the rotor 202 rotates, and may protect the exterior of the stator 204 from wear.

Downhole motor 200 may be fabricated in a variety of configurations. Generally, when viewed as a latitudinal cross-section as illustrated in FIG. 2B, the rotor 202 has $n_r$ lobes (210 in an exemplary embodiment as shown in FIG. 2B) and the stator 204 has $n_s$ lobes (212a, 212b in an exemplary embodiment as shown in FIG. 2B), wherein $n_s=n_r+1$. For example, FIGS. 2A-2C illustrate a downhole motor 200 with a 1:2 lobe profile, wherein rotor 202 has one lobe 210 and stator 204 has two lobes 212a, 212b.

Downhole motors are further described in a number of publications such as U.S. Pat. Nos. 7,442,019; 7,396,220; 7,192,260; 7,093,401; 6,827,160; 6,543,554; 6,543,132; 6,527,512; 6,173,794; 5,911,284; 5,221,197; 5,135,059; 4,909,337; 4,646,856; and 2,464,011; U.S. Patent Application Publication Nos. 2009/0095528; 2008/0190669; and 2002/0122722; and William C. Lyons et al., Air & Gas Drilling Manual: Applications for Oil & Gas Recovery Wells & Geothermal Fluids Recovery Wells §11.2 (3d ed. 2009); G. Robello Samuel, Downhole Drilling Tools: Theory & Practice for Engineers & Students 288-333 (2007); Standard Handbook of Petroleum & Natural Gas Engineering 4-276-4-299 (William C. Lyons & Gary J. Plisga eds. 2006); and 1 Yakov A. Gelfgat et al., Advanced Drilling Solutions: Lessons from the FSU 154-72 (2003), which are expressly incorporated herein in their entireties by reference.

In operation, the helical formation on the rotor 202 seals tightly against the helical formation of the stator 204 as the rotor 202 rotates to form a set of cavities 206a, 206b in between. One or more drilling fluids are present and flow in the cavities 206a, 206b. Exemplary drilling fluids include, but are not limited to, mud, water, etc.

In an exemplary embodiment where the exemplary assembly of FIGS. 2A-2C operates as a pump, means are provided to rotate the rotor 202 relative to the stator 204. In use as a pump, relative rotation is provided between the rotor 202 and the stator 204 about the longitudinal axis L, for example, using a motor that provides mechanical energy to rotate the rotor 202. A drive shaft connected to the motor transfers mechanical energy generated by the motor to rotate the rotor 202 relative to and within the stator 204. As the rotor 202 rotates eccentrically within the stator 204, the cavities 206a, 206b progress axially along the longitudinal axis L to move the fluid present in the cavities 206a, 206b.

In an exemplary embodiment where the exemplary assembly of FIGS. 2A-2C operates as a mud motor, means are provided to be rotated by the rotation of the rotor 202 relative to the stator 204. In use as a mud motor, a fluid source pumps a fluid into the cavities 206a, 206b formed between the rotor 202 and the stator 204. The hydraulic pressure of the fluid causes the cavities 206a, 206b to progress axially along the longitudinal axis L and causes a relative rotation between the rotor 202 and the stator 204 about the longitudinal axis L. A drive shaft connected to the rotor 202 transfers mechanical energy generated by the rotation of the rotor 202 to another mechanical component, e.g., a drill string used in well drilling. In this manner, the hydraulic energy of the fluid is converted into mechanical energy which is transferred via the drive shaft to a drill string.

As progressive cavity pumps or motors rely on a seal between the outer surface of the rotor 202 and the inner surface of the stator 204, the operating efficiency of a progressive cavity pump or rotor requires that at least one of the surfaces be sufficiently resilient to seal against the hydraulic pressure of the fluid moving through the pump or motor. Some conventional pumps and motors provide a relatively thin layer of elastomer on the inner surface of the stator 204 to form a resilient surface. A stator design having a thin elastomeric layer is typically referred to as a "thin wall" or "wall" design.

In contrast to some conventional pumps and motors that provide a resilient layer on the inner surface of the stator, exemplary embodiments provide a resilient material on or in close proximity to the outer surface of the rotor to ensure a reliable seal between the outer surface of rotor and the inner surface of the stator. This optimizes the operating efficiency of the exemplary progressive cavity pump or motor.

FIGS. 3A-3D illustrate perspective views of an exemplary mold used in forming an outer resilient layer on a rotor. The exemplary mold illustrated in FIGS. 3A-3D is formed of four detachable members 302, 304, 306 and 308 that take the shape of a three-dimensional rectangle, i.e., a rectangular box, when the detachable members are clamped together. The detachable members form four quadrants of the three-dimensional rectangle, in which first member 302 (FIG. 3A) forms a first quadrant, second member 304 (FIG. 3B) forms a second quadrant, third member 306 (FIG. 3C) forms a third quadrant, and fourth member 308 (FIG. 3D) forms a fourth quadrant.

Each of the mold members 302, 304, 306 and 308 includes a shaped inner surface (illustrated in FIG. 3C as cavity 310) that extends along the longitudinal axis L of the mold member. When the mold members 302, 304, 306 and 308 are clamped together to form the complete mold, the inner surfaces of the clamped mold members form a single mold cavity that extends along the longitudinal axis L and within which a rotor may be accommodated for molding.

In other exemplary embodiments, exemplary molds may be formed by more or fewer detachable members than those illustrated in FIGS. 3A-3D. Alternatively, exemplary molds may be single integral structures or may be formed by a plurality of non-detachable members.

Figure 3A:
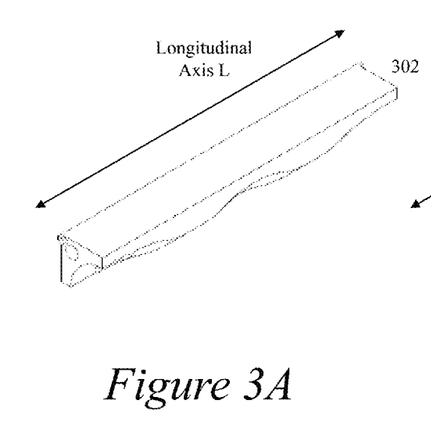
FIG. 3A illustrates a perspective view of a first detachable member of an exemplary mold for forming a resilient outer layer of a rotor.
Figure 3B:
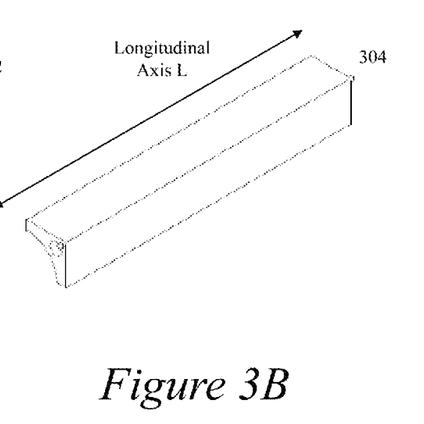
FIG. 3B illustrates a perspective view of a second detachable member of an exemplary mold for forming a resilient outer layer of a rotor.
Figure 3C:
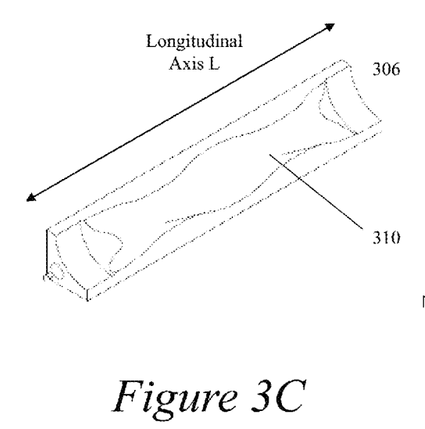
FIG. 3C illustrates a perspective view of a third detachable member of an exemplary mold for forming a resilient outer layer of a rotor.
Figure 3D:
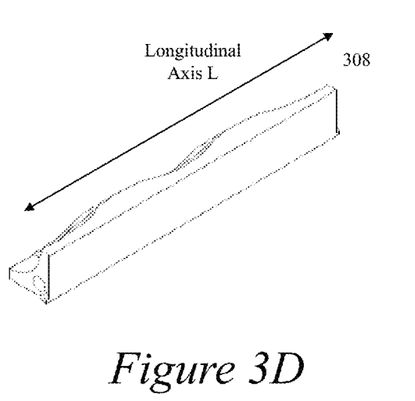
FIG. 3D illustrates a perspective view of a fourth detachable member of an exemplary mold for forming a resilient outer layer of a rotor.
Figure 4A:
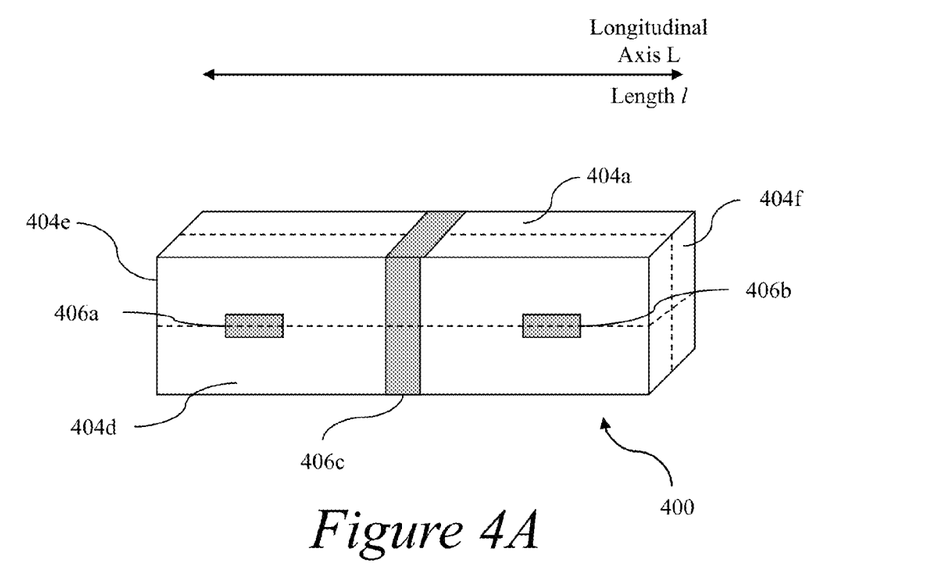
FIG. 4A illustrates a perspective view of an exemplary mold in a closed state.
Figure 4B:
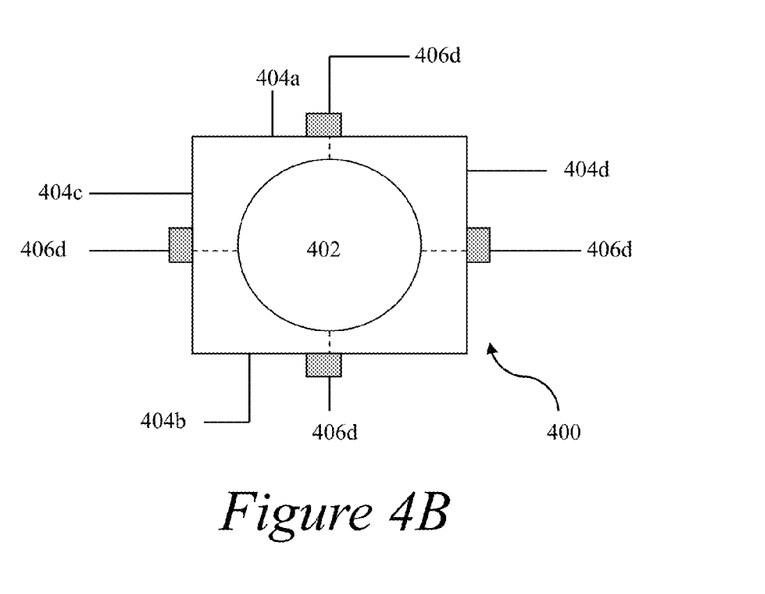
FIG. 4B illustrates a sectional view taken through a transverse axis of the exemplary mold of FIG. 4A in a closed state.

FIG. 4A illustrates a perspective view of the exemplary mold members 302, 304, 306 and 308 of FIGS. 3A-3C clamped to form an overall closed mold 400. FIG. 4B is a transverse sectional view of the closed mold 400 illustrated in FIG. 4A.

The mold members are clamped together to provide the mold 400 a substantially box-like shape in which the mold cavity 402 is enclosed by a number of walls, e.g., a top wall 404a (illustrated in FIGS. 4A and 4B), a bottom wall 404b (illustrated in FIG. 4B), a first side wall 404c (illustrated in FIG. 4B), a second side wall 404d (illustrated in FIGS. 4A and 4B), a first end wall 404e (illustrated in FIG. 4A), and a second end wall 404f (illustrated in FIG. 4A). The walls of the mold 400 enclose and define the mold cavity 402 when the mold is in its closed state (as illustrated in FIG. 4B).

The inner surface of the mold cavity 402 has a female helical configuration that has the opposite profile as the male helical formation on the outer surface of a rotor. The diameter of the mold cavity 402 is somewhat larger than the diameter of the rotor such that a void is left between the inner surface of the mold cavity 402 and the outer surface of the rotor when the rotor is placed inside the mold cavity. The resilient material used to form the outer surface of the rotor may be provided in the void between the outer surface of the rotor and the inner surface of the mold cavity 402 in order to bond the resilient material to the rotor.

The exemplary mold 400 is held in place in its closed state by one or more clamping mechanisms (e.g., exemplary clamping mechanisms 406a, 406b, 406c and 406d shown in FIG. 4A and 406d shown in FIG. 4B) that have a low thermal expansion property. The clamping mechanisms may be low thermal expansion bolts in an exemplary embodiment. Exemplary low thermal expansion materials include, but are not limited to, HRA929 from Hitachi Metals which may be combined with ceramics and/or glass, Invar (a nickel steel alloy), Elinvar (another nickel steel alloy), etc.

Figure 5A:
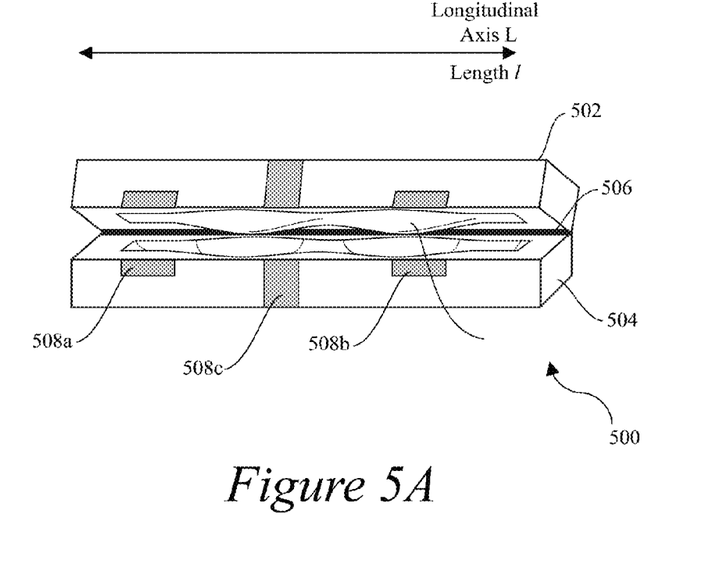
FIG. 5A illustrates a perspective view of an exemplary mold in an open state.
Figure 5B:
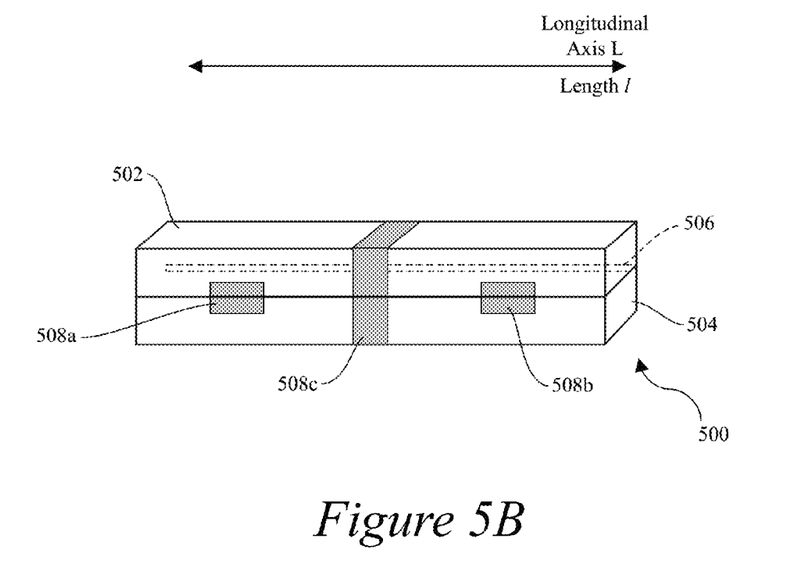
FIG. 5B illustrates a perspective view of the exemplary mold of FIG. 5A in a closed state.
Figure 5C:
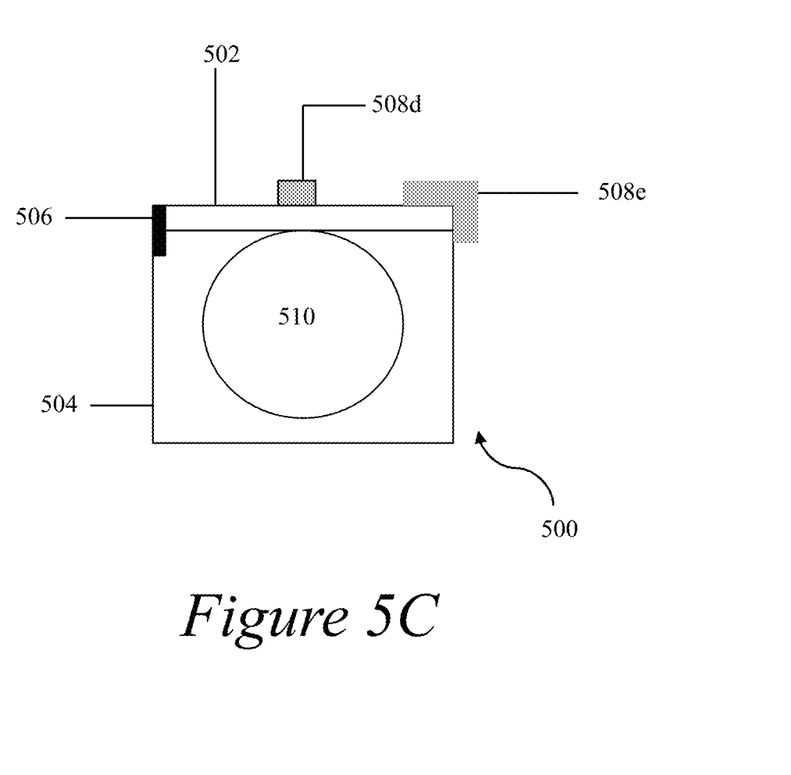
FIG. 5C illustrates a sectional view taken through a transverse axis of the exemplary mold of FIG. 5B in a closed state.

Another exemplary mold may take the shape of a clamshell in which two halves are connected and hinge along a common joint and may be opened and closed relative to the joint. FIGS. 5A-5C illustrate an exemplary mold 500 which takes the shape of a clam-shell. FIG. 5A illustrates a perspective view of the mold 500 in an open state. FIG. 5B illustrates a perspective view of the mold 500 in a closed state. FIG. 5C illustrates a transverse sectional view of the mold 500 in a closed state.

In the exemplary mold 500, two sections, a top section 502 and a bottom section 504, are connected and hinged along a hinge 506 that is provided at a common joint between the top and bottom sections. In an exemplary embodiment, the hinge 506 may be continuous and may extend substantially along the length of the mold 500. In another exemplary embodiment, a plurality of hinges may be provided along the length of the mold 500. The top section 502 and/or the bottom section 504 may be opened and closed relative to the hinge 506. In an exemplary embodiment, the top section 502 may take the form of a lid that closes over the bottom section 504.

The bottom section 504 includes a mold cavity 510 (illustrated in FIG. 5C) in which a rotor may be accommodated during molding. The inner surface of the mold cavity 510 has a female helical configuration that has the opposite profile as the male helical formation on the outer surface of a rotor. The diameter of the mold cavity 510 is somewhat larger than the diameter of the rotor such that a void is left between the inner surface of the mold cavity 510 and the outer surface of the rotor when the rotor is placed inside the mold cavity. The resilient material used to form the outer surface of the rotor may be provided in the void between the outer surface of the rotor and the inner surface of the mold cavity 510 in order to bond the resilient material to the rotor.

The exemplary mold 500 is held in place in its closed state by one or more clamping mechanisms (e.g., exemplary clamping mechanisms 508a, 508b, 508c shown in FIGS. 5B and 508d and 508e shown in FIG. 5C) that have a low thermal expansion property. The clamping mechanisms may be low thermal expansion bolts in an exemplary embodiment. Exemplary low thermal expansion materials include, but are not limited to, HRA929 from Hitachi Metals which may be combined with ceramics and/or glass, Invar (a nickel steel alloy), Elinvar (another nickel steel alloy), etc.

Exemplary molds may take other shapes and are not limited to the illustrated embodiments.

Exemplary embodiments provide methods and devices for manufacturing exemplary mold cavities with a desired structure and shape based on the structure and shape of the corresponding rotors that are to be formed with an outer layer of a resilient material using the exemplary molds. Exemplary manufacturing methods configure the profile, cross-sectional shape and helical pitch of the mold cavities based on the profile, cross-sectional shape and helical pitch of the corresponding rotors. In exemplary embodiments, an exemplary mold may be machined in several parts. In case of a rotor having multiple lobes, a multi-segmented mold may be machined for convenience. The mold may be formed of any number of suitable materials including, but not limited to, steel, stainless steel, aluminum, titanium, high strength plastics, etc.

Figures 6A, 6B:
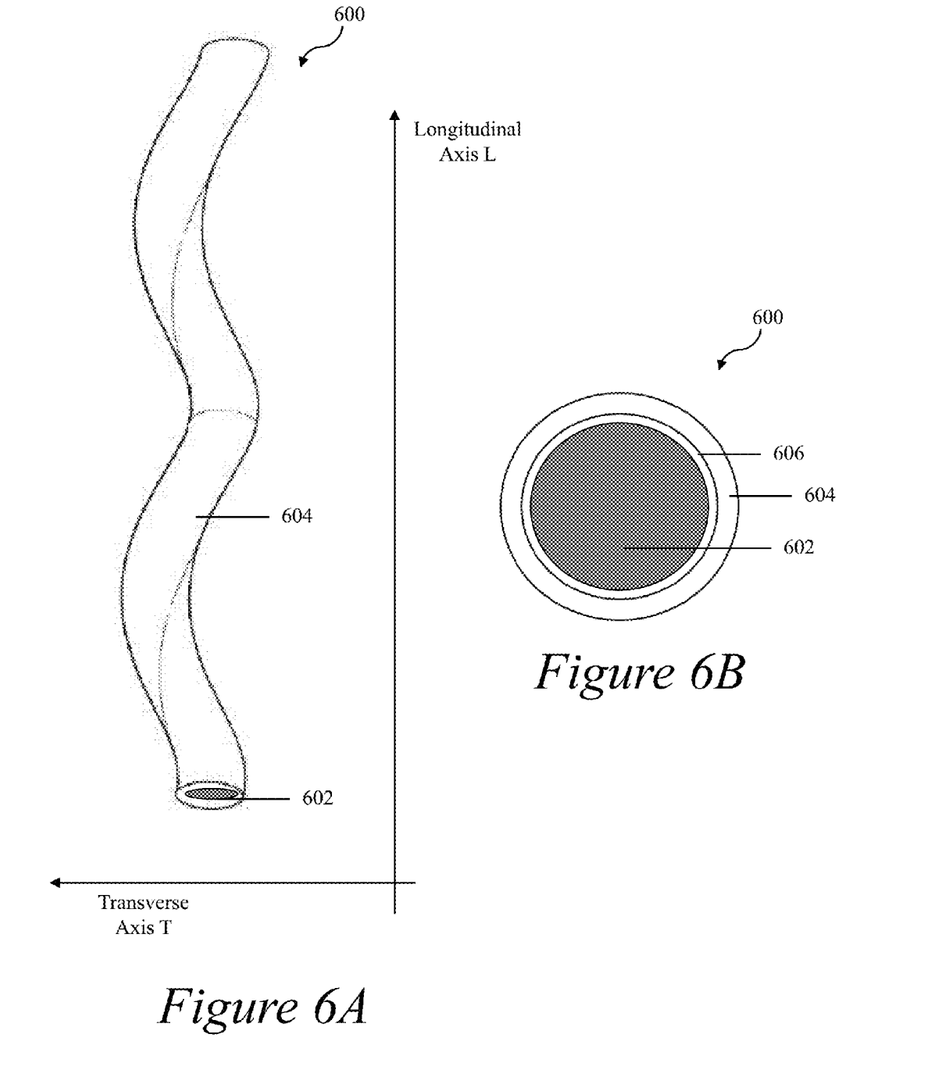
FIG. 6A illustrates a perspective view of an exemplary rotor with an outer layer of a resilient material according to an exemplary embodiment.
FIG. 6B illustrates a cross-sectional view taken along a transverse axis of the exemplary rotor of 6A with an outer layer of a resilient material according to an exemplary embodiment.

FIG. 6A illustrates a perspective view of an exemplary rotor 600 having an outer layer formed from a resilient material. FIG. 6B illustrates a cross-sectional view taken along a transverse axis T of the exemplary rotor 600 of 6A with an outer layer formed of a resilient material. The exemplary rotor 600 includes a substantially longitudinal rotor core 602 that forms the body of the rotor 600 and that transmits torque in the rotor 600 to other motor or pump components.

The rotor 600 includes one or more resilient outer layers 604 formed of one or more resilient materials provided in proximity to or in direct or indirect contact with the outer surface of the rotor core 602. The resilient layer 604 may form a uniform or a non-uniform layer over the rotor core 602. The resilient layer 604 may have a uniform thickness or alternatively may have a non-uniform thickness over different parts of the rotor core 602. In an exemplary embodiment, a single continuous resilient layer 604 is provided on the entire outer surface of the rotor core 602. In another exemplary embodiment, the resilient layer 604 is provided on a portion of the outer surface of the rotor core 602 or on discontinuous portions of the outer surface of the rotor core 602.

In an exemplary embodiment, an exemplary rotor may include a resilient outer layer formed of a single resilient material. In another exemplary embodiment, different sections of the rotor may include resilient outer layers that are formed of different resilient materials. For example, a first section of the rotor may include a resilient outer layer formed of a first resilient material, while a different second section may include a resilient outer layer formed of a second resilient material.

In an exemplary embodiment, an exemplary rotor may include a resilient outer layer having a single layer of resilient material. In another exemplary embodiment, an exemplary rotor may include a resilient outer region having multiple layers of resilient material. The multiple layers may be formed of the same resilient material or of different resilient materials. For example, a first resilient layer formed of a first resilient material may be provided on the rotor, with or without a bonding agent, and a second resilient layer formed of a second resilient material may be provided on the first resilient outer layer, with or without a bonding agent, to form a multiple layer resilient outer region.

In exemplary embodiments, the resilient outer layer may be reinforced with other materials including, but not limited to, fibers, fabrics, three-dimensional structures, etc. In an exemplary embodiment, materials such as fibers, fabrics, three-dimensional structures, etc., may be provided within the resilient material of the resilient outer layer. In an exemplary embodiment in which multiple resilient outer layers are provided on a rotor, materials such as fibers, fabrics, three-dimensional structures, etc., may be provided within or between multiple resilient outer layers.

The resilient material may include, but is not limited to, a rubber material that can withstand and is suitable for the operating conditions of the rotor (e.g., the temperature, pressure, chemical environment, etc.). Exemplary families of rubber for downhole use in exemplary rotors include, but are not limited to, elastomers, fluoroelastomers (e.g., the Viton® fluoroelastomer and similar rubbers), XHNBR, HNBR, NBR, nitrile rubbers, etc. The rubber used in exemplary rotors may be fully or only partially cured or green. An exemplary resilient material is partially cured rubber.

The resilient material may also include high temperature resistance polymers and composites that become "rubbery" above their glass transition temperature, $T_g$, and that remain "solid" at lower temperatures, e.g., epoxy resins, polyimides, polyetherimides, polyetherketones, polyetheretherketones (PEEK), polyhedrons, phenolic resins, polysulfide (PSU), polyphenylene sulfide (PPS), etc.

In an exemplary embodiment, the resilient material remains resilient across a temperature range of between room temperature (that is typically below the material's glass transition temperature) and about 250° C. In another exemplary embodiment, the resilient material remains resilient across a temperature range of between the material's glass transition temperature and about 250° C. An exemplary resilient material's glass transition temperature ranges between about 30° C. and about 150° C. In yet another exemplary embodiment, the resilient material remains resilient above 250° C.

The rotor 600 may optionally include one or more adhesive layers 606 provided between the rotor core 602 and the resilient layer 604 to improve bonding between the resilient layer and the rotor core. The adhesive layer 606 may include any number of adhesives suitable for bonding the resilient layer 604 to the rotor core 602. In exemplary embodiments, the adhesive material is applied to the outer surface of the rotor core 602 and/or the inner surface of the resilient layer 602 using any number of suitable techniques, e.g., spraying, brushing, etc.

Exemplary methods of providing a resilient outer layer on an exemplary rotor core using a mold will now be described in more detail with reference to FIGS. 7 and 8.

Figure 7:
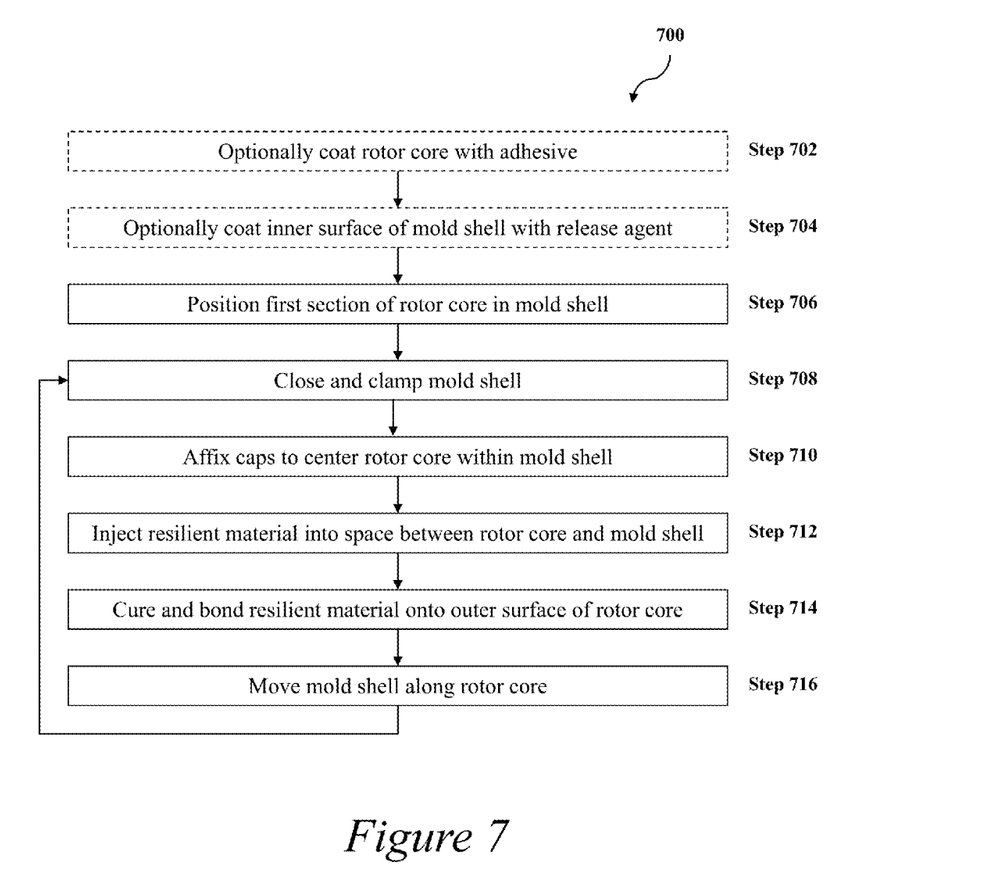
FIG. 7 is a flowchart illustrating an exemplary method of forming a rotor with an outer layer of a resilient material.

FIG. 7 is a flowchart illustrating an exemplary method 700 of forming a rotor with a resilient outer layer. In step 702, the outer surface of the rotor core is optionally coated with a bonding agent that forms an adhesive layer. In step 704, the inner surface of the mold is optionally coated with a release agent to inhibit bonding of the resilient material to the mold surface. The release agent may be a temporary release agent, e.g., the DuPont™ TraSys® 423 mold release agent, the DuPont™ TraSys® 307 mold release agent, etc. A temporary release agent may be re-applied to the inner surface of the mold every time the mold is used in molding. The release agent may alternatively be a permanent release agent, e.g., PTFE from Fluorocarbon, the Apticote™ 460M mold release agent from Poeton, etc.

In step 706, a first section of the rotor core is positioned within the mold cavity. Since the inner surface of the mold cavity has a larger diameter than the outer surface of the rotor core, step 706 leaves a space between the mold cavity and the rotor core. In step 708, the mold is closed and held in place using one or more clamping mechanism that has a low thermal expansion property, e.g., low thermal expansion bolts.

In step 710, the rotor core may be kept centered within the mold using one end cap affixed to an end of the mold and the rotor, or two end-caps affixed to the two ends of the mold and the rotor. In step 712, the resilient material is injected into the space between the rotor core and the mold cavity.

In step 714, the resilient material is cured and bonded directly or indirectly to the outer surface of the rotor core to form a resilient outer layer. In an exemplary embodiment, the curing or bonding is accomplished by heat curing, e.g., by placing the mold and rotor core assembly in an autoclave oven. In another exemplary embodiment, the curing or bonding is accomplished by using another source of suitable electromagnetic radiation. Any form of electromagnetic radiation may be used from the infrared to the high-energy frequencies beyond the ultraviolet, as required to cure the resilient material chosen for this purpose. In yet another exemplary embodiment, the curing or bonding is accomplished by applying mechanical pressure to the mold to force the resilient material toward the outer surface of the rotor core using, for example, a hydraulic press, which causes the resilient material to be bonded to the outer surface of the rotor core.

In an exemplary embodiment, the curing technique in step 714 raises the temperature within the mold and causes expansion of the rotor core and the resilient material. Since the clamping mechanism has a low thermal expansion property, it does not expand to the same extent as the rotor core and the resilient material and, therefore, the clamping mechanism constrains expansion of the rotor core and the resilient material. As such, expansion of the rotor core and the resilient material causes an increase in pressure within the mold as it is held in place by the clamping mechanism. The combination of the high temperature and the high pressure causes the resilient material to be cured or bonded to the rotor core. Upon curing or bonding, the resilient material takes the shape of the outer surface of the rotor core to form the resilient outer layer.

In an exemplary embodiment, the length of the rotor core taken along the longitudinal axis L is substantially equal to the length/of the mold. In this embodiment, the method 700 is complete after step 714 and the mold need not be reused to complete treatment of the rotor core.

In another exemplary embodiment, the length of the rotor core taken along the longitudinal axis L is greater than the length/of the mold. That is, the length/of the mold is a fraction of the total rotor length, and treatment of the entire length of the rotor core requires reuse of the mold over two or more molding sessions. In this exemplary embodiment, in step 716, the mold is moved or slid along the rotor core to enclose a new section of the rotor core within the mold, and the method 700 returns to step 708 to cover the new section of the rotor core with the resilient outer layer. Steps 702 and 704 may be repeated prior to treating the new section of the rotor core.

In an exemplary embodiment, in step 716, the mold may be positioned such that there is no overlap between the sections of the rotor core treated with the resilient material in consecutive molding sessions. The sections of the rotor core treated with the resilient material in consecutive molding sessions may be contiguous or non-contiguous. In another exemplary embodiment, in step 716, the mold may be positioned such that there is an overlap between the sections of the rotor core that are treated with the resilient material in consecutive molding sessions. The bonding between the resilient material and the rotor core may be stronger at the overlapped sections. The overlaps may result in a thicker or multi-tiered outer layer of resilient material formed on the rotor core. In case an overlap causes over-curing of the resilient material at the overlapped section, exemplary embodiments may employ cooling to reduce the extent of the curing at the overlapped sections.

The method 700 may repeat in this manner until a resilient outer layer is formed for the entire outer surface or a desired portion of the rotor core.

FIG. 7 is an exemplary flowchart, and alternative methods of forming a rotor core with a resilient outer layer may include more or fewer steps than those shown in FIG. 7.

Figure 8:
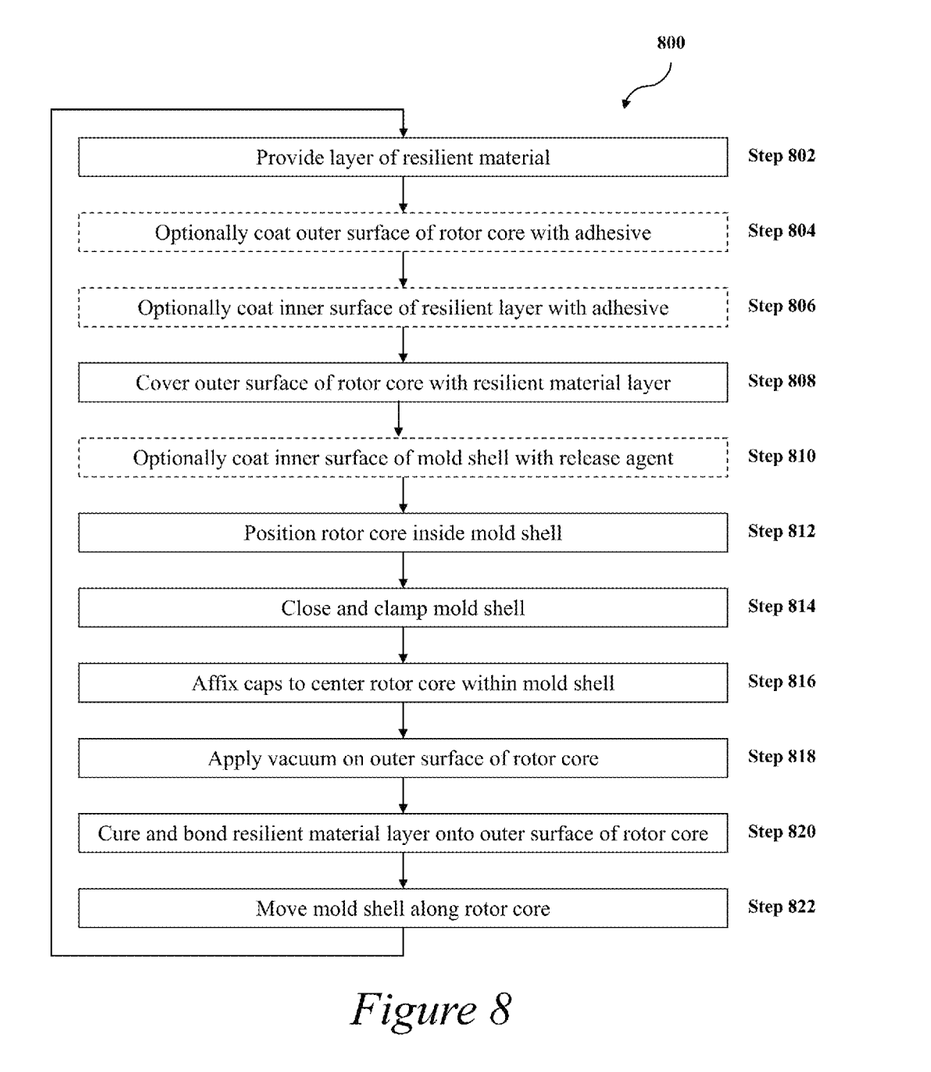
FIG. 8 is a flowchart illustrating another exemplary method of forming a rotor with an outer layer of a resilient material.

FIG. 8 is a flowchart illustrating an exemplary clamping method 800 of providing a resilient outer layer on an exemplary rotor core. In step 802, a layer of the resilient material is provided or optionally prepared, e.g., by co-extruding the resilient material, by wrapping thin layers of the resilient material together, etc. The layer of the resilient material may be in the form of a single-layered or multi-layered tube or sheet. In steps 804 and 806, the outer surface of the rotor core and/or the inner surface of the resilient material layer are optionally coated with a bonding agent that forms an adhesive layer. In step 808, the outer surface of the rotor core is covered with the resilient material layer. In step 810, the inner surface of the mold is optionally coated with a release agent to inhibit bonding of the resilient material layer to the mold surface. The release agent may be a temporary release agent, e.g., the DuPont™ TraSys® 423 mold release agent, the DuPont™ TraSys® 307 mold release agent, etc. A temporary release agent may be re-applied to the inner surface of the mold every time the mold is used in molding. The release agent may alternatively be a permanent release agent, e.g., PTFE from Fluorocarbon, the Apticote™ 460M mold release agent from Poeton, etc.

In step 812, a part of the rotor core covered by the resilient material layer is positioned within the mold cavity. In step 814, the mold is closed and held in place using a clamping mechanism that has a low thermal expansion property, e.g., low thermal expansion bolts. In step 816, the rotor core may be kept centered within the mold using one end cap affixed to an end of the mold and the rotor, or two end-caps affixed to the two ends of the mold and the rotor.

The outer surface of the rotor core may include one or more intercept ports which may be connected to a port running longitudinally along the length of the rotor core. The intercept ports and the longitudinal port may be connected to an external suction device that sucks out air from the outer surface of the rotor core in order to apply a vacuum on the outer surface of the rotor core. In step 818, a vacuum is applied on the outer surface of the rotor core using the intercept ports before curing in order to draw the resilient material layer into close engagement with the outer surface of the rotor core during curing. This enhances the conformance of the resilient material layer to the shape of the outer surface of the rotor core.

In step 820, the mold pushes the resilient material layer onto the outer surface of the rotor core, and the resilient material layer is cured and bonded onto the outer surface of the rotor core to form a resilient outer layer. In an exemplary embodiment, the curing or bonding is accomplished by heat curing, e.g., by placing the mold and rotor core assembly in an autoclave oven. In another exemplary embodiment, the curing or bonding is accomplished by using another source of suitable electromagnetic radiation. Any form of electromagnetic radiation may be used from the infrared to the high-energy frequencies beyond the ultraviolet, as required to cure the resilient material chosen for this purpose. In yet another exemplary embodiment, the curing or bonding is accomplished by applying mechanical pressure to the mold which constrains the expansion of the resilient material and the rotor core which, in turn, forces the resilient material toward the outer surface of the rotor core using, for example, a hydraulic press.

In an exemplary embodiment, the curing technique in step 820 raises the temperature within the mold and causes expansion of the rotor core and the resilient material layer. Since the clamping mechanism has a low thermal expansion property, it does not expand to the same extent as the rotor core and the resilient material layer. As such, expansion of the rotor core and the resilient material layer causes an increase in pressure within the mold as it is held in place by the clamping mechanism. The combination of the high temperature and the high pressure causes the resilient material layer to be cured to the rotor core. Upon curing, the resilient material layer takes the shape of the outer surface of the rotor core to form the resilient outer layer.

In an exemplary embodiment, the length of the rotor core taken along the longitudinal axis L is substantially equal to the length/of the mold. In this embodiment, the method 800 is complete after step 820 and the mold need not be reused to complete treatment of the rotor core.

In another exemplary embodiment, the length of the rotor core taken along the longitudinal axis L is greater than the length/of the mold. That is, the length/of the mold is a fraction of the total rotor length and treatment of the entire length of the rotor core requires reuse of the mold over two or more molding sessions. In this exemplary embodiment, in step 822, the mold is moved or slid along the rotor core to enclose a new section of the rotor core, and the method 800 returns to step 802 to cover the new section of the rotor core with the resilient outer layer. In an exemplary embodiment, in step 822, the mold may be positioned such that there is no overlap between the sections of the rotor core treated with the resilient material in consecutive molding sessions. The sections of the rotor core treated with the resilient material may be contiguous or non-contiguous.

In another exemplary embodiment, in step 822, the mold may be positioned such that there is an overlap between the sections of the rotor core that are treated with the resilient material in consecutive molding sessions. The bonding between the resilient material and the rotor core may be stronger at the overlapped sections. The overlaps may result in a thicker or multi-tiered outer layer of resilient material formed on the rotor core. In the case that an overlap causes over-curing of the resilient material at the overlapped section, exemplary embodiments may employ cooling to reduce the extent of the curing at the overlapped sections.

The method 800 may repeat in this manner until the resilient outer layer is provided on the entire rotor core or a desired portion of the rotor core.

FIG. 8 is an exemplary flowchart, and alternative methods of covering a rotor core with a resilient outer layer may include more or fewer steps than those shown in FIG. 8.

One of ordinary skill in the art will appreciate that the present invention is not limited to the specific exemplary embodiments described herein. Many alterations and modifications may be made by those having ordinary skill in the art without departing from the spirit and scope of the invention. One of ordinary skill in the art will recognize, or be able to ascertain using no more than routine experimentation, many equivalents of the specific embodiments of the invention described herein. Such equivalents are intended to be encompassed by the following claims. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

INCORPORATION BY REFERENCE

All patents, published patent applications and other references disclosed herein are hereby expressly incorporated herein in their entireties by reference.

What is claimed is:

1. A progressive cavity drive component, comprising:
    a first progressive cavity drive component rotatably positionable within a longitudinal bore of a second progressive cavity drive component, the first progressive cavity drive component comprising:
        a metallic shaft having a length and an outer surface, the outer surface being apportioned along the length of the metallic shaft in to a plurality of sections, the metallic shaft having a first helical configuration formed on the outer surface that is complementary to a helical surface configuration of the second progressive cavity drive component, and
        a resilient outer layer formed of a resilient material bonded to the outer surface of the metallic shaft along the length of the metallic shaft, the resilient material further including a first resilient outer layer formed of a first material and a second resilient outer layer formed of a second material different from the first material of the first resilient outer layer, wherein the first resilient outer layer is formed to surround the metallic shaft at a first section of the plurality of sections of the outer surface of the metallic shaft and the second resilient outer layer is formed to surround the metallic shaft at a second section of the plurality of sections along the metallic shaft that is different from the first section.

2. The progressive cavity drive component of claim 1, wherein the resilient outer layer comprises multiple layers.

3. The progressive cavity drive component of claim 1, wherein the resilient outer layer is reinforced with another material.

4. The progressive cavity drive component of claim 1, wherein a glass transition temperature of at least one of the first or second materials ranges between about 30° C. and about 150° C.

5. The progressive cavity drive component of claim 1, wherein the resilient outer layer is configured to sealably connect the first helical configuration of the first progressive cavity drive component to the second helical configuration of the second progressive cavity drive component as the first progressive cavity drive component rotates within the longitudinal bore of the second progressive cavity drive component.

6. The progressive cavity drive component of claim 1, wherein the first progressive cavity drive component is a rotor and the second progressive cavity drive component is a stator.

7. The progressive cavity drive component of claim 1, wherein the first progressive cavity drive component further comprises:
    an adhesive layer disposed between the metallic shaft and the resilient outer layer to enhance bonding of the resilient outer layer to the outer surface of the metallic shaft.

8. The progressive cavity drive component of claim 1, wherein the second progressive cavity drive component comprises:
    a tubular structure having the longitudinal bore with an inner bore surface having the first helical configuration.

9. The progressive cavity drive component of claim 1, wherein the first progressive cavity drive component is formed of a composite material.

10. The progressive cavity drive component of claim 1, wherein the first progressive cavity drive component is formed of a powder metal.

11. The progressive cavity drive component of claim 1, wherein the resilient outer layer is bonded to the outer surface of the metallic shaft through constrained expansion of the resilient outer layer and the metallic shaft.

12. A downhole tool for drilling, comprising:
    a first progressive cavity drive component having a longitudinal bore and at least one radially inwardly projecting lobe extending along a selected length on an inner surface of the first progressive cavity drive component; and
    a second progressive cavity drive component rotatably positionable within the longitudinal bore of the first progressive cavity drive component, the second progressive cavity drive component comprising:
        a metallic shaft having a length and an outer surface, the outer surface being apportioned along the length of the metallic shaft in to a plurality of sections, the metallic shaft having at least one radially outwardly projecting lobe extending along a selected length on the outer surface that is complementary to the at least one inwardly projecting lobe of the first progressive cavity drive component, and
        a resilient outer layer formed of a resilient material bonded to the outer surface of the metallic shaft along the length of the metallic shaft, the resilient outer layer characterized by an increased radial thickness at an interface between adjacent sections of the plurality of sections, the resilient material including a first resilient outer layer formed of a first material and a second resilient outer layer formed of a second material different from the first material of the first resilient outer layer, wherein the first resilient outer layer is formed to surround the metallic shaft at a first section of the plurality of sections of the outer surface of the metallic shaft and the second resilient outer layer is formed to surround the metallic shaft at a second section of the plurality of sections along the metallic shaft that is different from the first section.

* * * * *